UNITED STATES PATENT OFFICE.

PAUL VOLKMANN, OF ELBERFELD, GERMANY, ASSIGNOR TO FARBENFABRIKEN VORM. FRIEDR. BAYER & CO., OF ELBERFELD, GERMANY, A CORPORATION OF GERMANY.

AZO DYE.

No. 902,186.  Specification of Letters Patent.  Patented Oct. 27, 1908.

Application filed June 17, 1908. Serial No. 438,922.

*To all whom it may concern:*

Be it known that I, PAUL VOLKMANN, doctor of philosophy, chemist, citizen of the German Empire, residing at Elberfeld, Germany, Kingdom of Prussia, have invented new and useful Improvements in New Azo Dyes, of which the following is a specification.

I have found that new and valuable azo-dyestuffs dyeing the fiber from yellow to red to brown shades can be obtained by combining diazocompounds with sulfonic acids of 1-naphthyl-3-methyl-5-pyrazolones.

The new dyestuffs are after being dried and pulverized in the shape of their sodium salts powders soluble in water and soluble in concentrated sulfuric acid. They yield upon reduction with stannous chlorid and hydrochloric acid amins and sulfonic acids of 4-amino-1-naphthyl-3-methyl-5-pyrazolones.

In carrying out my invention practically I give the following examples, the parts being by weight:

Example 1.—9.3 parts of anilin are diazotized in the usual manner by means of 7 parts of sodium nitrite and the necessary quantity of hydrochloric acid. The resulting diazo solution is then added to a solution which has to be well stirred of 38.2 parts of 1-beta-naphthyl-4.8-disulfonic acid-3-methly-5-pyrazolone in an excess of sodium carbonate. After half an hour the formation of the dyestuff is complete. The product of the reaction is heated to 70° C. and the dyestuff is precipitated by the addition of common salt, filtered off and dried. It dyes wool from acid baths in very level pure yellow shades fast to light.

Example 2.—21.2 parts of toluidin are tetrazotized in the usual manner by means of 13.8 parts of sodium nitrite and the necessary quantity of hydrochloric acid; the resulting tetrazo compound is then introduced into a well cooled solution of 76.4 parts of 1-beta-naphthyl-4.8-disulfonic acid-3-methyl-5-pyrazolone containing an excess of sodium carbonate. The dyestuff separates during the reaction. It is filtered off and dried. It dyes unmordanted cotton red shades of excellent fastness to acids.

Example 3.—18.4 parts of benzidin are tetrazotized in the usual way and the tetrazo compound is combined with a solution of 13.8 parts of salicylic acid containing a slight excess of sodium carbonate. The formation of the intermediate compound is complete after 24 hours. An alkaline solution of 38.2 parts of 1-beta-naphthyl-4.8-disulfonic acid-3-methyl-5-pyrazolone is added and the mixture is stirred for 12 hours. It is then heated, and the dyestuff is salted out, filtered off and dried. It dyes unmordanted cotton very pure yellowish orange shades of good fastness to light.

In the following table the shades produced by some of the new dyestuffs are given:

| Dyestuff: | Dyes wool: |
|---|---|
| 1) anilin+1-β-naphthyl-4.8-disulfonic acid-3-methyl-5-pyrazolone. | yellow. |
| 2) anilin+1-α-naphthyl-3.5.7-trisulfonic acid-3-methyl-5-pyrazolone. | yellow. |
| 3) para-toluidin+1-β-naphthyl-6.8-disulfonic acid-3-methyl-5-pyrazolone. | greenish-yellow. |
| 4) 2-toluidin-5-sulfonic acid+1-β-naphthyl-4.8-disulfonic acid-3-methyl-5-pyrazolone. | yellow. |
| 5) meta-xylidin+1-β-naphthyl-6.8-disulfonic acid-3-methyl-5-pyrazolone. | reddish-yellow. |
| 6) 2.5-dichloroanilin+1-β-naphthyl-6.8-disulfonic acid-3-methyl-5-pyrazolone. | greenish-yellow. |
| 7) α-naphthylamin+1-β-naphthyl-4.8-disulfonic acid-3-methyl-5-pyrazolone. | orange. |
| 8) 2-naphthylamin-4.8-disulfonic acid+1-β-naphthyl-4.8-disulfonic acid-3-methyl-5-pyrazolone. | reddish-yellow. |
| 9) 2-acetamino-4-toluidin+1-naphthol-4-sulfonic acid (saponified)+1-β-naphthyl-4.8-disulfonic acid-3-methyl-5-pyrazolone. | red. |
| 10) para-phenylenediamin+2 mol. 1-β-naphthyl-4.8-disulfonic acid-3-methyl-5-pyrazolone. | red. |
| 11) 5-nitro-2-aminophenol or 5-nitro-4-chloro-2-aminophenol+1-β-naphthyl-4.8-disulfonic acid-3-methyl-5-pyrazolone. | brown, chromed after dyeing: bluish-red. |
| 12) para-aminoacetanilid+salicylic acid (acetyl group split off)+1-β-naphthyl-4.8-disulfonic acid-3-methyl-5-pyrazolone. | reddish-orange, chromed after dyeing: bluish red. |
| | Dyes unmordanted cotton: |
| 13) dehydrothiotoluidin sulfonic acid+1-β-naphthyl-4.8-disulfonic acid-3-methyl-5-pyrazolone. | reddish-yellow. |
| 14) benzidin〈salicylic acid. 1-β-naphthyl-4.8-disulfonic acid-3-methyl-5-pyrazolone. | orange. |
| 15) benzidin〈1-β-naphthyl-4.8-disulfonic acid-3-methyl-5-pyrazolone. 2-amino-8-naphthol-6-sulfonic acid-azo-meta-phenylenediamin. | black-brown. |

Having now described my invention and in what manner the same is to be performed, what I claim is:—

The herein-described new azodyestuffs, obtainable by combining diazocompounds with sulfonic acids of 1-naphthyl-3-methyl-5-pyrazolones, which dyestuffs are after being dried and pulverized in the shape of their sodium salts powders soluble in water and soluble in concentrated sulfuric acid; yielding upon reduction with stannous chlorid and hydrochloric acid amins and sulfonic acids of 4-amino-1-naphthyl-3-methyl-5-pyrazolones and dyeing the fiber from yellow to red to brown shades, substantially as described.

In testimony whereof I have hereunto set my hand in the presence of two subscribing witnesses.

PAUL VOLKMANN. [L. S.]

Witnesses:
OTTO KÖNIG,
WM. WASHINGTON BRUNSWICK.

Correction in Letters Patent No. 902,186.

It is hereby certified that in Letters Patent No. 902,186, granted October 27, 1908, upon the application of Paul Volkmann, of Elberfeld, Germany, for an improvement in "Azo Dyes," an error appears in the printed specification requiring correction, as follows: In line 30, page 1, the word "methly" should read *methyl;* and that the said Letters Patent should be read with this correction therein that the same may conform to the record of the case in the Patent Office.

Signed and sealed this 17th day of November, A. D., 1908.

[SEAL.]

C. C. BILLINGS,
*Acting Commissioner of Patents.* dried and pulverized in the shape of their sodium salts powders soluble in water and soluble in concentrated sulfuric acid; yielding upon reduction with stannous chlorid and hydrochloric acid amins and sulfonic acids of 4-amino-1-naphthyl-3-methyl-5-pyrazolones and dyeing the fiber from yellow to red to brown shades, substantially as described.

In testimony whereof I have hereunto set my hand in the presence of two subscribing witnesses.

PAUL VOLKMANN. [L. S.]

Witnesses:
OTTO KÖNIG,
WM. WASHINGTON BRUNSWICK.

Correction in Letters Patent No. 902,186.

It is hereby certified that in Letters Patent No. 902,186, granted October 27, 1908, upon the application of Paul Volkmann, of Elberfeld, Germany, for an improvement in "Azo Dyes," an error appears in the printed specification requiring correction, as follows: In line 30, page 1, the word "methly" should read *methyl;* and that the said Letters Patent should be read with this correction therein that the same may conform to the record of the case in the Patent Office.

Signed and sealed this 17th day of November, A. D., 1908.

[SEAL.]

C. C. BILLINGS,
*Acting Commissioner of Patents.*

It is hereby certified that in Letters Patent No. 902,186, granted October 27, 1908, upon the application of Paul Volkmann, of Elberfeld, Germany, for an improvement in "Azo Dyes," an error appears in the printed specification requiring correction, as follows: In line 30, page 1, the word "methly" should read *methyl;* and that the said Letters Patent should be read with this correction therein that the same may conform to the record of the case in the Patent Office.

Signed and sealed this 17th day of November, A. D., 1908.

[SEAL.]

C. C. BILLINGS,
*Acting Commissioner of Patents.*